Jan. 21, 1964     H. C. SWIFT     3,118,519
AUTOMATIC BRAKE ADJUSTING MECHANISM
Filed July 30, 1962     2 Sheets-Sheet 1
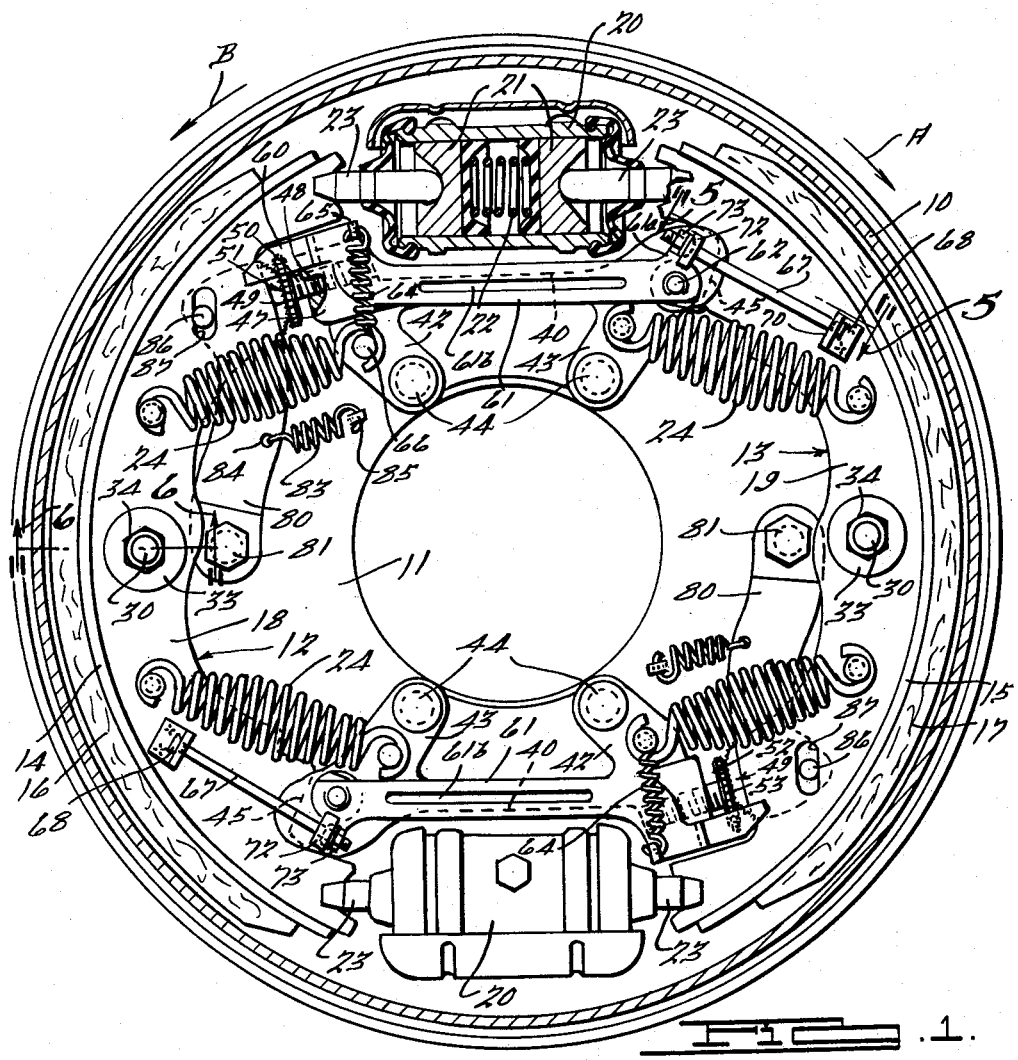
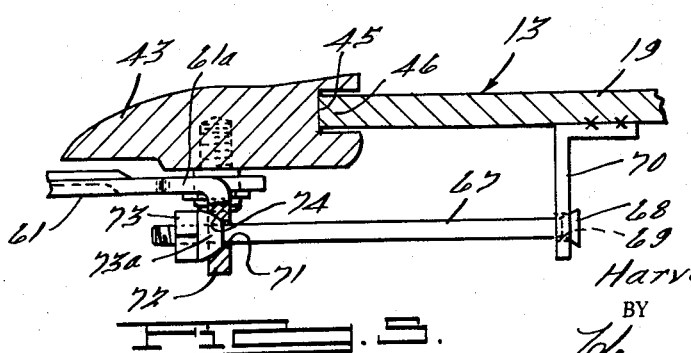
INVENTOR.
Harvey C. Swift.
BY
Harness, Dickey & Pierce
ATTORNEYS.

Jan. 21, 1964    H. C. SWIFT    3,118,519
AUTOMATIC BRAKE ADJUSTING MECHANISM
Filed July 30, 1962    2 Sheets-Sheet 2
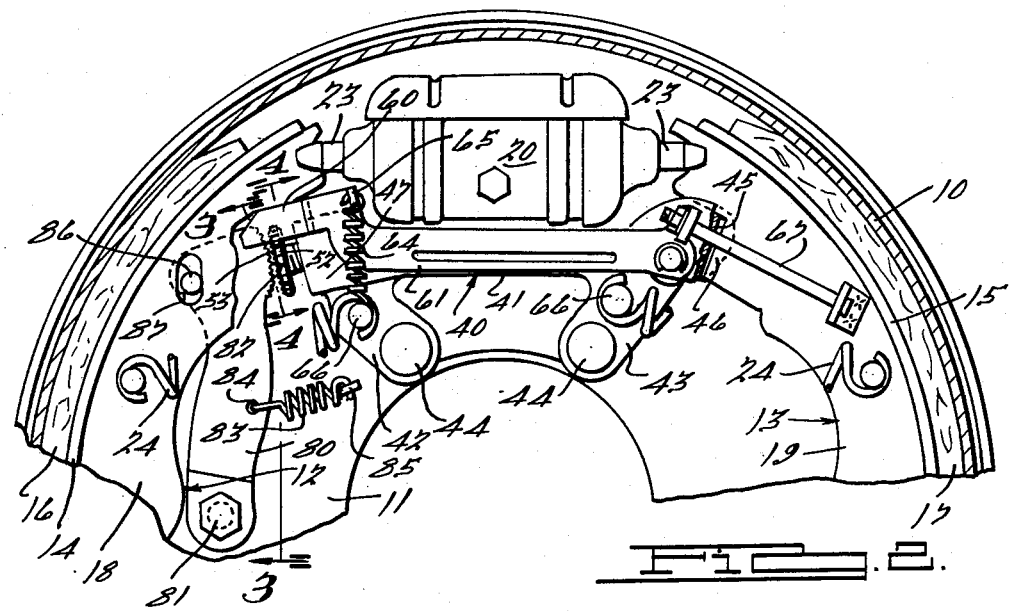
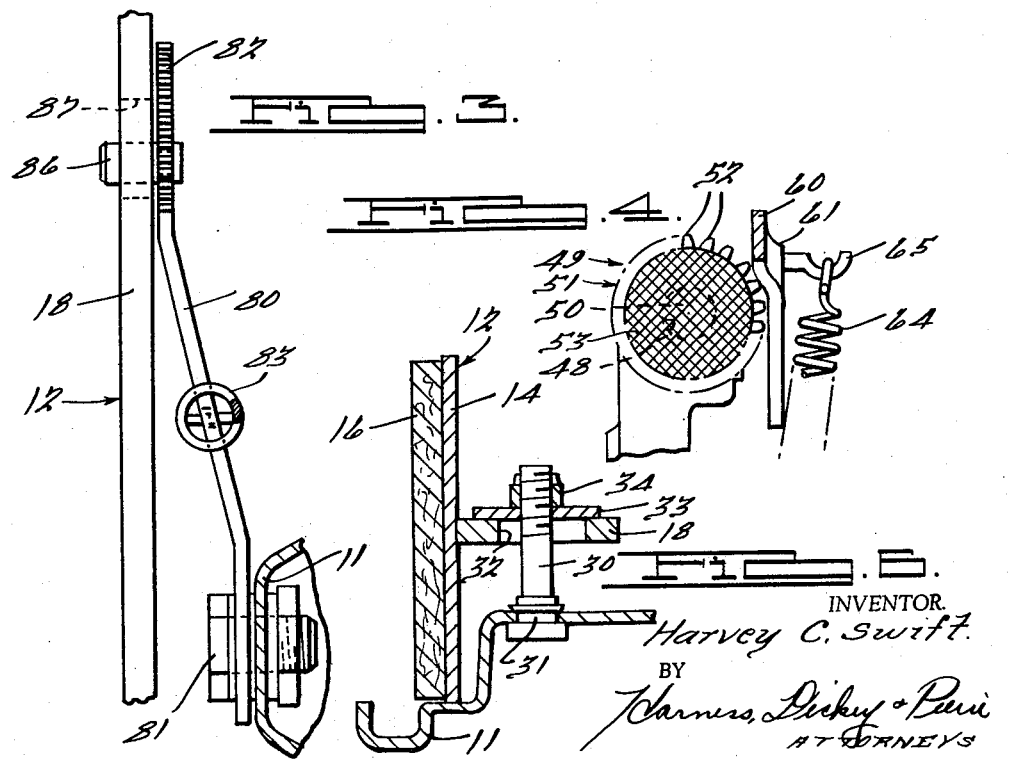
INVENTOR.
Harvey C. Swift
BY
Harness, Dickey & Pierce
ATTORNEYS

United States Patent Office 3,118,519
Patented Jan. 21, 1964

3,118,519
AUTOMATIC BRAKE ADJUSTING MECHANISM
Harvey C. Swift, Birmingham, Mich., assignor to Kelsey-Hayes Company, Romulus, Mich., a corporation of Delaware
Filed July 30, 1962, Ser. No. 213,213
10 Claims. (Cl. 188—79.5)

This invention relates to brakes of the type comprising an annular brake drum and arcuate brake shoes and more particularly to means for automatically adjusting the brakes responsively to the wear thereof.

A principal object of this invention is to provide an automatic adjuster for arcuate brake shoes adapted to prevent overadjustment of the brake shoes under all conditions.

Another object of this invention is to provide means for independently adjusting each brake shoe controlled by the wear on the brake shoe being adjusted.

Still another object of the invention is to provide automatic adjusting means for each brake shoe in which the action of the adjusting means is initiated by one shoe, irrespective of the extent of wear thereon, and transmitted to the other shoe when the latter has worn sufficiently to require adjustment.

A further object of the invention is to provide automatic adjusting means of this type which is rendered operative only when the vehicle is moving in reverse and which does not affect the normal operation of the brakes when applied during the forward movement of the vehicle.

Further objects of this invention are to provide a device of this type which is efficient, durable, and of simple construction comprising a minimum number of parts, whereby it may be economically manufactured and assembled with facility.

The various objects and advantages, and the novel details of construction of one commercially practical embodiment of the invention, will become more apparent as this description proceeds, especially when considered in connection with the accompanying drawings, in which:

FIGURE 1 is a sectional elevational view of a brake incorporating the features of this invention, the brake shoes being shown in released position;

FIGURE 2 is a fragmentary view similar to FIGURE 1 with the brake shoes applied and the brake drum rotating in the reverse direction;

FIGURE 3 is a fragmentary sectional elevational view taken substantially on the plane indicated by line 3—3 in FIGURE 2;

FIGURE 4 is a fragmentary sectional elevational view taken substantially on the plane indicated by line 4—4 in FIGURE 2;

FIGURE 5 is a detail sectional elevational view taken substantially on the plane indicated by line 5—5 in FIGURE 1; and FIGURE 6 is a detail sectional view taken on the plane indicated by line 6—6 in FIGURE 1.

The illustrative embodiment of the invention is shown in the drawings as applied to a brake structure of the internal expanding type comprising arcuate brake shoes adapted to cooperate with the inner surface of a brake drum. The environment in which the invention is illustrated is shown in FIGURES 1 and 2, in which the reference character 10 indicates a brake drum which is mounted on a wheel hub (not shown) for rotation therewith. A stationary backing plate 11 is mounted on a stationary part of the vehicle (not shown).

In addition to the elements already described, the basic elements of the brake structure comprise a pair of brake shoes 12 and 13 in the form of arcuate segments, said brake shoes being provided with arcuate rim portions 14 and 15 supporting lining elements 16 and 17, respectively.

The rim portions 14 and 15 are reinforced against flexure by web portions 18 and 19 extending perpendicularly from the rim portions 14 and 15.

A hydraulic wheel or brake cylinder 20 is interposed between each pair of adjacent ends of the brake shoes 12 and 13. These wheel cylinders are of conventional construction, each comprising a pair of pistons 21 urged apart by a light spring 22. The pistons 21 operate plungers 23, extending from opposite ends of the cylinder for engagement with the webs 18 and 19 and providing the actuating means for moving the brake shoes 12 and 13 into engagement with the brake drum 10. Hydraulic fluid is delivered to the brake cylinders 20 between the pistons 21 from a conventional brake pedal operated master cylinder (not shown). Retraction springs 24 normally retain the ends of the brake shoes in engagement with the plungers 23 and with the stationary and adjustable anchors yet to be described.

Each brake shoe is guided and held in proper relation to the backing plate 11 by means of a hold-down device illustrated more in detail in FIGURE 6. Each hold-down device consists of a stud 30 secured as at 31 to the backing plate 11 and extending perpendicularly therefrom. The stud passes through an enlarged opening 32 in the web of the brake shoe and carries a washer 33 secured in place on the end of the stud 30 by means of a nut 34. With the means just described, the brake shoes are held and properly located with respect to the backing plate 11.

The structure thus far described is substantially conventional and the features which form the subject matter of the present invention will now be described in detail. This invention relates to means for automatically adjusting the brake shoes when adjustment is necessary due to wear on the brake linings thereof and to provide means for preventing overadjustment of the brake shoes under all conditions.

The structure about to be described is duplicated at both ends of the brake shoes so that automatic adjustment of both shoes of the brake assembly is provided for.

For the purposes of this description, reference will be made to the automatic adjusting means shown at the upper portion of the brake assembly illustrated in FIGURE 1 and in FIGURE 2.

Secured to the backing plate 11 is a torque-taking or torque-resisting member 40 which consists essentially of a transverse strut 41 connecting spaced arms 42 and 43. The torque-resisting member is secured to the backing plate by means of rivets, bolts, or the like 44 so as to be rigid therewith. The arm 43 is provided with a slot or recess 45 acting as a fixed anchor to receive the end of the brake shoe web as indicated at 46 in FIGURE 2. The other arm 42 of the torque-resisting member 40 is provided with a threaded opening 48 adapted to receive an adjustable anchor 49. The adjustable anchor consists of an adjusting screw or threaded shank 50 threadedly received in the threaded opening 48 and a flat head 51 in the form of a toothed gear or star wheel having peripheral teeth 52 and a flat top surface 53 which is knurled or otherwise roughened. The head 51 of the adjustable anchor 49 is adapted to engage the adjacent portion of the web 18 of the adjacent brake shoe 12 so that when the adjustable anchor is actuated in one direction to move the threaded shank 50 out of the threaded recess 48, the brake shoe 12 will be adjusted towards the brake drum to take up any wear in the lining 16 thereof.

The toothed or star wheel is adapted to be engaged by the pawl portion 60 of an adjusting lever 61 pivotally mounted as at 62 to the arm 43 of the torque-resisting member 40. The adjusting lever 61 is substantially in the form of a bellcrank being provided with a short, laterally-extending arm 61a. The bellcrank is also ribbed longitudinally as at 61b for the purpose of making the same more rigid.

The pawl 60 is biased in the direction in which it will engage the teeth 52 of the adjustable anchor by means of a spring 64 connected to the adjusting lever 61 by an arm 65 and to a fixed anchor 66 on the arm 42 of the torque-resisting member 40. When the spring 64 functions to swing the lever 61 about its pivot 62, the pawl 60 thereof will engage a tooth and rotate the threaded shank 50 in a direction to move the brake shoe 12 towards the brake drum.

In describing this invention, the left-hand brake shoe 12, as shown in FIGURE 1, will be referred to as the first brake shoe, and the right-hand brake shoe 13 will be referred to as the second brake shoe.

The adjusting lever 61 is operatively connected to the second brake shoe 13 by means of a link 67 provided with a headed end 68 which slidably engages in an aperture 69 formed in a bracket 70 secured to the web 19 of the second brake shoe 13. The other end of the link 67 is slidably received in an aperture 71 formed in a lug 72 bent up from the short arm 61a of the lever 61. Adjustable on the end of the link 67 is a nut 73 having a rounded portion 73a which engages a dished portion 74 at the adjacent side of the opening 71. The details just described are shown best in FIGURE 5. Thus, when the second brake shoe 13 moves in the direction of the arrow A (FIGURE 1), which it does when the vehicle is moving in a reverse direction, motion will be transmitted from the second brake shoe 13 through the link 67 to the adjusting lever 61 to rock the same about its pivot 62 to raise the pawl 60 to cock or move the pawl to an operative position against the action of the spring 64, whereupon, in its subsequent downward movement, influenced by the spring 64, it will engage one of the teeth 52 and rotate screw 50 to adjust the adjustable anchor. The lever 61 and the pawl 60 are limited in their downward movement by the engagement of the lug 72 with the nut 73. Pivotal movement of the link 67 during movement of the brake shoe 13 is permitted by reason of the engagement of the rounded portion 73a of the nut 73 with the dish-shaped portion 74 of the lug 72, see FIGURE 5.

From FIGURE 4, it will be noted that the arm 65 to which the spring 64 is connected extends laterally from the general plane of the adjusting lever 61 so that the spring 64 is arranged at an angle to the plane of movement of the adjusting lever 61 and tends to bias the lever 61 toward the toothed wheel 52. Thus, the pawl portion 60 of the lever 61 will always engage a tooth 52, and, during the upward movement of the lever under the action of link 67, the lever 61 will deflect slightly to allow the pawl 60 to slide over the teeth.

It is an important feature of this invention to provide an automatic adjusting means as previously described having means for preventing overadjustment of the brake shoe under all conditions. This invention provides means for permitting adjustment of the brake shoe only when there is excessive movement of the brake shoe due to wear on the lining thereof.

This latter means comprises a locking lever 80 pivotally mounted as at 81 to the backing plate 11. The free end of this lever is provided with a roughened or serrated face 82 adapted to engage the knurled surface 53 on the adjustable anchor, and, when so engaged, to prevent adjustment of the anchor. The lever 80 is normally biased into engagement with the anchor by means of a spring 83 connected to the locking lever 80 as at 84 and to a fixed lug 85 on the backing plate 11. Thus, the locking lever 80 is normally urged into locking engagement with the anchor.

In order to cause the release of the locking lever 80 from its locking position, an operative connection is established between the locking lever and the web 18 of the adjacent brake shoe 12. This consists of a pin 86 projecting laterally from the lever 80 and engaging a slot 87 formed in the web 18 of the brake shoe. The diameter of the pin 86 is smaller than the width and length of the slot 87, so that the brake shoe may participate of lateral and rotative movement without actuating the locking lever 80. Normally, the pin 86 will be positioned against the left-hand side of the slot 87, as shown in FIGURE 1, and upon normal operation of the brake, the brake shoe will not move sufficiently to engage the pin to actuate the locking lever 80. If, however, the brake shoe partakes of excessive movement due to wear of the brake lining, the right-hand side of the slot will engage the pin 86 as shown in FIGURE 2, and thus move the lever 80 to the left against the action of spring 83 to thus move the serrated face 82 out of engagement with the knurled surface 53 of the anchor member. Under these conditions, the anchor member is free to be rotatively adjusted and thus the spring 64 will move the pawl portion 60 and the lever 61 downwardly to rotate the adjusting screw 50 one tooth space. It will be recalled that the adjusting lever 61 has been previously moved to cocked or ready position with respect to the toothed wheel 52, so that as soon as this toothed wheel is released, the adjusting lever 61 will function to adjust the adjustable anchor.

From the foregoing, it will be seen that during normal operation of the brakes, the locking lever 80 prevents adjustment of the adjustable anchor and it is only when the brake shoe 12 partakes of excessive movement due to wear on its lining 16 that the locking lever will be released to permit adjustment of the anchor.

As previously mentioned, the structure just described in detail is duplicated at the diametrically opposite side of the brake assembly shown at the bottom of FIGURE 1, in which instance the brake shoe 13 is the first or primary shoe and the brake shoe 12 is the second or secondary shoe.

The vehicle in its forward direction rotates the drum in the direction of arrow B, and, as previously mentioned, the arrow A indicates the direction of movement of the brake drum when the vehicle is in reverse. Normally, it is during the reverse direction that the adjusting lever 61 is cocked or readied. However, if the link 67 were lengthened and the end 68 connected to the web 19 of the brake shoe 13 at a point beyond the mid-point of the brake shoe, the movement of the brake shoe 13 during the application of the brakes while the vehicle is moving in a forward direction would likewise serve to move the adjusting lever 61 to cock or ready the same, as previously described.

While a commercially practical embodiment of the invention has been described and illustrated herein somewhat in detail, it will be understood that various changes may be made as may come within the purview of the accompanying claims.

What is claimed is:

1. In a brake comprising first and second brake shoes, a brake drum, a backing plate, and means for moving said brake shoes into engagement with said brake drum, that improvement which comprises, an adjustable anchor carried by said backing plate adapted for engagement by said first shoe, means mounted on said backing plate normally locking said anchor to prevent adjustment thereof, means connected to said second shoe and activated by movement of said second shoe for adjusting said anchor, and means connecting said locking means to said first shoe and actuated by excessive movement of said first shoe due to wear for releasing said locking means to permit adjustment of said anchor.

2. A brake comprising first and second brake shoes, a brake drum, a backing plate, means for expanding said brake shoes into engagement with said brake drum, an adjustable anchor engageable with said first shoe at one end thereof, an adjusting member for adjusting said anchor, means operated by said second shoe upon movement thereof for moving said adjusting member to an operative position with respect to said anchor, means mounted on said backing plate normally locking said anchor to prevent adjustment of said anchor by said adjusting member, and means connecting said locking means to said first shoe and actuated by said first shoe upon excessive movement thereof to release said locking means and permit the adjustment of said anchor by said adjusting member.

3. A brake comprising first and second brake shoes each having a brake lining, a rotatable brake drum, a backing plate, means for moving said brake shoes into engagement with said brake drum, an adjustable anchor carried by said backing plate adapted for engagement by said first shoe, an adjusting lever pivotally mounted on said backing plate and functioning as a pawl for adjusting said anchor, means connecting said adjusting lever to said second shoe whereby movement of said second shoe will move said adjusting lever to cocked position with respect to said anchor, means mounted on said backing plate normally locking said anchor to prevent adjustment thereof, and means connecting said locking means to said first shoe and actuated by excessive movement of said first shoe due to wear of the brake lining for releasing said locking means to permit said adjusting lever to adjust said anchor.

4. A device as described in claim 3 in which the adjustable anchor is a threaded member having a head provided with peripheral teeth and a flat roughened surface, and said locking means is a member provided with a roughened surface engaging the flat roughened surface of said head in the locking position of said locking means.

5. A device as described in claim 3 in which the adjustable anchor is an adjusting screw having a head provided with peripheral teeth adapted to be engaged by the adjusting lever pawl, and provided with a top surface which is knurled, and said locking means is a lever pivotally mounted on said backing plate and provided with a serrated portion engaging said knurled portion in the locking position of said locking means.

6. A device as described in claim 3 in which the adjustable anchor is an adjusting screw having a head provided with peripheral teeth adapted to be engaged by the adjusting lever pawl, and provided with a roughened top surface, and said locking means is a lever pivotally mounted on said backing plate and provided with a roughened surface engaging said roughened top surface, and in which said lever is spring biased in the direction to engage said roughened surfaces and is moved in the opposite direction by a pin and slot connection with said first shoe.

7. A device as described in claim 3 in which said adjusting lever is substantially a bellcrank pivotally mounted on said backing plate, a pawl on one end of said lever adapted to adjust said anchor, and a link connecting the other end of said lever to said second shoe to actuate the lever upon movement of said second shoe, said link acting to limit movement of said lever in one direction.

8. A device as described in claim 3 in which said adjusting lever is a bellcrank pivotally mounted on said backing plate and having a long arm and a short arm, a pawl on the end of the long arm of said bellcrank adapted to adjust said anchor, and a link having a pivoted connection with the short arm of said bellcrank and slidably connected to said second shoe, whereby to actuate said adjusting lever upon movement of said second shoe in one direction.

9. A brake comprising first and second brake shoes, each having a brake lining, a rotatable brake drum, a backing plate, means for moving said brake shoes into engagement with said brake drum, an adjusting lever functioning as a pawl pivotally mounted on said backing plate, an adjustable anchor carried by said backing plate adapted for engagement by said first shoe and comprising a threaded member having a head provided with peripheral teeth adapted to be engaged by the adjusting lever pawl, said head having a roughened surface, means connecting said adjusting lever to said second shoe, whereby movement of said second shoe will move said adjusting lever to operative position with respect to the toothed head of said anchor, a locking lever pivotally mounted on said backing plate and provided with a roughened surface adapted to engage the roughened surface on said head, spring means normally biasing said locking lever in a direction to engage said roughened surfaces, and a pin and slot connection between said locking lever and said first shoe for moving said locking lever in the opposite direction to separate said roughened surfaces when said first shoe is moved a predetermined distance due to excessive wear on the lining thereof.

10. A brake comprising first and second brake shoes, each having a brake lining, a rotatable brake drum, a backing plate, means for moving said brake shoes into engagement with said brake drum, a torque-resisting member secured to said backing plate, means for anchoring the end of the second shoe on said member, an adjustable anchor carried by said member adapted for engagement by said first shoe, an adjusting lever pivotally mounted on said member and functioning as a pawl for adjusting said anchor, means connecting said adjusting lever to said second shoe, whereby movement of said second shoe will move said adjusting lever to operative position with respect to said anchor, locking means mounted on said backing plate normally preventing adjustment of said anchor, and means connecting said locking means to said first shoe and actuated by excessive movement of said first shoe due to wear on the brake lining for releasing said locking means to permit said adjusting lever to adjust said anchor.

References Cited in the file of this patent

UNITED STATES PATENTS

| | | |
|---|---|---|
| 1,824,052 | La Brie | Sept. 22, 1931 |
| 2,389,618 | Goepfrich | Nov. 27, 1945 |